US010628564B2

(12) United States Patent
Murakami

(10) Patent No.: US 10,628,564 B2
(45) Date of Patent: Apr. 21, 2020

(54) AIR CONDITIONER CONNECTION SYSTEM

(71) Applicant: Mitsubishi Electric Corporation, Tokyo (JP)

(72) Inventor: Yoshiro Murakami, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 223 days.

(21) Appl. No.: 15/538,724

(22) PCT Filed: Mar. 12, 2015

(86) PCT No.: PCT/JP2015/057350
§ 371 (c)(1),
(2) Date: Jun. 22, 2017

(87) PCT Pub. No.: WO2016/143130
PCT Pub. Date: Sep. 15, 2016

(65) Prior Publication Data
US 2018/0004920 A1    Jan. 4, 2018

(51) Int. Cl.
*G06F 21/30* (2013.01)
*H04B 3/54* (2006.01)
(Continued)

(52) U.S. Cl.
CPC ............ *G06F 21/305* (2013.01); *F24F 11/30* (2018.01); *F24F 11/62* (2018.01); *G06F 21/44* (2013.01);
(Continued)

(58) Field of Classification Search
CPC ....... G06F 21/305; G06F 21/44; G08C 17/02; F24F 11/62; F24F 11/30; F24F 11/56;
(Continued)

(56) References Cited

U.S. PATENT DOCUMENTS 7,289,631 B2    10/2007  Ishidoshiro
7,334,417 B2    2/2008   Tokushige et al.
(Continued)

FOREIGN PATENT DOCUMENTS

EP    2479735 A2     7/2012
JP    2004-215232 A  7/2004
(Continued)

OTHER PUBLICATIONS

International Search Report of the International Searching Authority dated Jun. 9, 2015 for the corresponding international application No. PCT/JP2015/057350 (and English translation).
(Continued)

*Primary Examiner* — Travis C Ruby
(74) *Attorney, Agent, or Firm* — Posz Law Group, PLC

(57) ABSTRACT

An air conditioner connection system includes an air conditioner having a first device connected via a power line in a communication-capable manner, and a second device capable of performing radio communication with the air conditioner. The air conditioner includes an authentication process control unit that controls the first device to perform an authentication process when a starting request of the authentication process for performing power carrier communication is received from the second device, the first device includes an authentication process unit that performs the authentication process under the control of the air conditioner, and the second device includes an authentication start process unit that transmits the starting request of the authentication process to the air conditioner.

3 Claims, 12 Drawing Sheets

(51) Int. Cl.
*G08C 17/02* (2006.01)
*G06F 21/44* (2013.01)
*F24F 11/30* (2018.01)
*F24F 11/62* (2018.01)
*H04L 9/08* (2006.01)
*H04L 12/28* (2006.01)
*F24F 11/54* (2018.01)
*F24F 11/56* (2018.01)

(52) U.S. Cl.
CPC ............ *G08C 17/02* (2013.01); *H04B 3/54* (2013.01); *H04L 9/0822* (2013.01); *H04L 12/281* (2013.01); *F24F 11/54* (2018.01); *F24F 11/56* (2018.01); *H04B 2203/5441* (2013.01)

(58) Field of Classification Search
CPC ... F24F 11/54; H04B 3/54; H04B 2203/5441; H04L 9/0822; H04L 12/281
See application file for complete search history.

(56) References Cited

U.S. PATENT DOCUMENTS

| | | | | |
|---|---|---|---|---|
| 7,340,909 | B2* | 3/2008 | Kwon | H04L 12/2818 62/175 |
| 7,523,619 | B2 | 4/2009 | Kojima et al. | |
| 2002/0116342 | A1* | 8/2002 | Hirano | G06Q 10/087 705/64 |
| 2003/0219108 | A1* | 11/2003 | Sasaki | H04B 3/54 379/102.03 |
| 2005/0204758 | A1* | 9/2005 | Kwon | H04L 12/2818 62/175 |
| 2006/0105760 | A1* | 5/2006 | Shamoon | G01D 21/00 455/423 |
| 2009/0003832 | A1* | 1/2009 | Pederson | H04B 10/1143 398/135 |
| 2009/0072954 | A1* | 3/2009 | Kim | H04B 3/54 375/285 |
| 2009/0110108 | A1* | 4/2009 | Kennedy | H04B 1/71635 375/295 |
| 2011/0312278 | A1* | 12/2011 | Matsushita | H04L 12/40013 455/66.1 |
| 2012/0232969 | A1* | 9/2012 | Fadell | G06Q 10/20 705/14.4 |
| 2013/0173064 | A1* | 7/2013 | Fadell | G05D 23/1902 700/276 |
| 2013/0247117 | A1* | 9/2013 | Yamada | G08C 17/02 725/93 |
| 2014/0012422 | A1 | 1/2014 | Kates | |
| 2014/0118120 | A1* | 5/2014 | Chen | G08C 17/02 340/12.5 |
| 2015/0046701 | A1* | 2/2015 | Rooyakkers | H04L 9/083 713/156 |
| 2015/0095790 | A1* | 4/2015 | Yoshida | G06F 3/0482 715/740 |
| 2016/0327296 | A1* | 11/2016 | Leising | H04L 67/12 |
| 2016/0342297 | A1* | 11/2016 | Ellwood | G09G 5/12 |
| 2017/0038087 | A1* | 2/2017 | Nabeshima | G05B 15/02 |

FOREIGN PATENT DOCUMENTS

| | | |
|---|---|---|
| JP | 2004-316995 A | 11/2004 |
| JP | 2005-201504 A | 7/2005 |
| JP | 2005-274117 A | 10/2005 |
| JP | 2007-116378 A | 5/2007 |
| JP | 2007-164612 A | 6/2007 |
| JP | 2009-044407 A | 2/2009 |
| JP | 2012-161001 A | 8/2012 |
| KR | 1020090041606 A | 4/2009 |

OTHER PUBLICATIONS

Extended European Search Report dated Jun. 7, 2017 issued in corresponding EP patent application No. 15871316.4.
Office Action dated Nov. 28, 2018 issued in corresponding JP patent application No. 2017-504532 (and English machine translation thereof).
Office Action dated Apr. 12, 2019 issued in corresponding CN patent application No. 201580076241.7 (and English translation).

* cited by examiner

| COMMAND TYPE | DATA PART SIZE | DATA PART | CHECK CODE |
|---|---|---|---|
| 0x02 (PLC SETTING) | 0x01 (1byte) | 0x01 (PLC AUTHENTI-CATION START) | FCC (TWO'S COMPLEMENT OF DATA PART BYTE SUM) |

| COMMAND TYPE | DATA PART SIZE | DATA PART | | CHECK CODE |
|---|---|---|---|---|
| 0x02 (PLC SETTING) | 0x02 (1byte) | 0x01 (PLC AUTHENTICATION START) | 0x78 (PLC AUTHENTICATION START TIMER) | FCC (TWO'S COMPLEMENT OF DATA PART BYTE SUM) |

AIR CONDITIONER CONNECTION SYSTEM

CROSS REFERENCE TO RELATED APPLICATION

This application is a U.S. national stage application of International Patent Application No. PCT/JP2015/057350 filed on Mar. 12, 2015, the disclosure of which is incorporated herein by reference.

TECHNICAL FIELD

The present application relates to a network-connectable air conditioner connection system.

BACKGROUND

In recent years, power carrier communication has attracted attention as a communication system capable of constituting a local area network (LAN) without performing an additional wiring work in a home network. In the power carrier communication, security is ensured by encrypting communication data using an encryption key shared by a base unit and a slave unit. In the power carrier communication, an authentication process for sharing the encryption key is performed. For the method of the authentication process, for example, there is a technique in which an authentication process between a base unit and a slave unit is carried out in the situation where buttons provided in the base unit and the slave unit are pushed down within a predetermined time (see Patent Literature 1).

PATENT LITERATURE

Patent Literature 1: Japanese Patent Application Laid-Open No. 2004-215232

When an installation type device installed in a house is to be connected by the power carrier communication, in a device installed at a high location such as an air conditioner, there are problems in which it is difficult to perform an operation of pushing a button down, in the first place, and thus it is not possible to easily carry out an authentication process.

SUMMARY

The present invention has been made in view of the above circumstances, and an object thereof is to provide an air conditioner connection system capable of easily performing the authentication process when connecting the installation type device set in a house by the power carrier communication.

In order to solve the above-mentioned problem and achieve the object, the present invention provides an air conditioner connection system comprising an air conditioner including a first device connected via a power line in a communication-capable manner, and a second device capable of performing radio communication with the air conditioner, wherein the air conditioner includes an authentication process control unit that controls the first device to perform an authentication process when a starting request of the authentication process for performing power carrier communication is received from the second device, the first device includes an authentication process unit that performs the authentication process under the control of the air conditioner, and the second device includes an authentication start process unit that transmits the starting request to the air conditioner.

In order to solve the above-mentioned problem and achieve the object, the present invention provides an air conditioner connection system comprising an air conditioner including a first device connected via a power line in a communication-capable matter, a second device capable of performing radio communication with the air conditioner, and a third device that is connected to an external network via a home network in a communication-capable manner while being connected to the first device via the power line in a communication-capable manner, wherein the air conditioner includes an authentication process control unit that controls the first device to perform an authentication process with the third device when a starting request of the authentication process for performing power carrier communication is received from the second device, the first device comprises an authentication process unit that performs the authentication process under the control of the air conditioner, and the second device comprises an authentication start process unit that transmits the starting request to the air conditioner.

According to the present invention, it is possible to easily perform an authentication process when connecting the installation type device installed in a house by the power carrier communication.

DETAILED DESCRIPTION

Hereinafter, air conditioner connection systems according to embodiments of the present invention will be described in detail with reference to the drawings. Note that the invention is not limited by the embodiments described below. In the following description, the power carrier communication is referred to as PLC (Power Line Communication), but the power carrier communication may also be referred to as power line communication, high-speed power line communication, electric light line communication or PLT (Power Line Telecommunication).

First Embodiment

Figure 1:
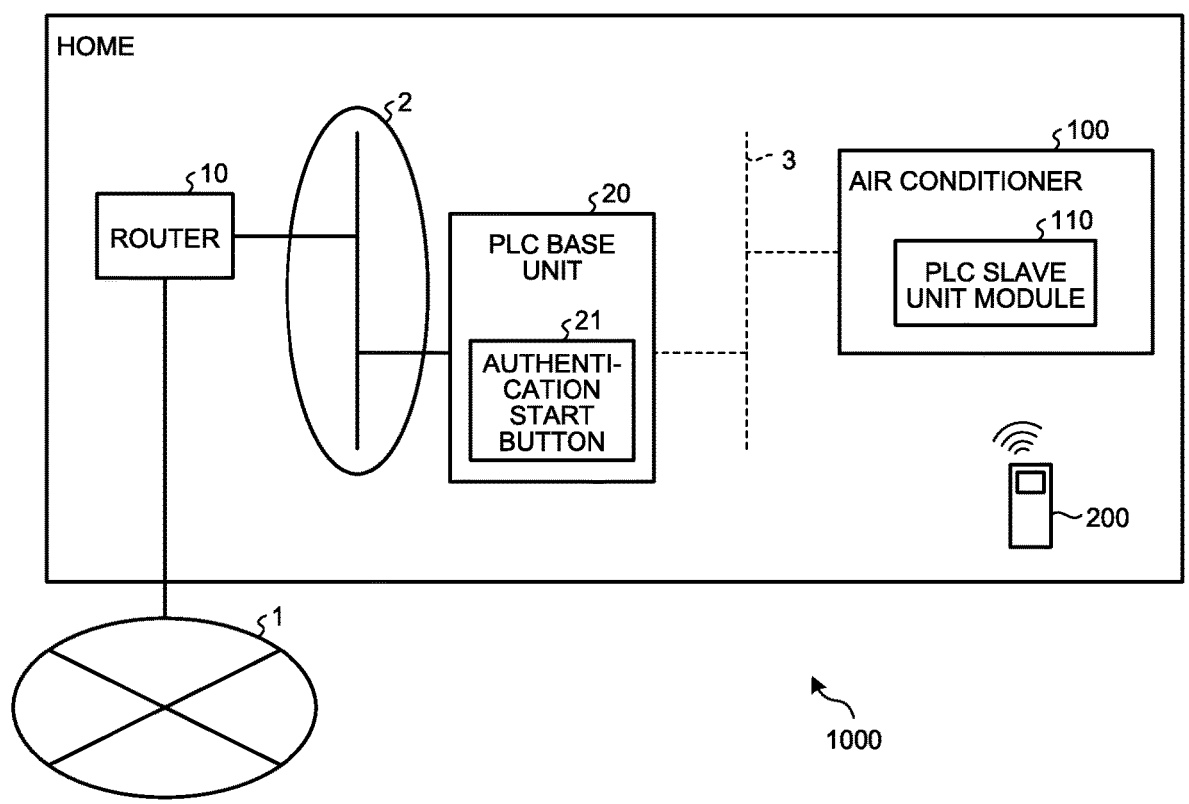
FIG. 1 is a diagram illustrating an example of a system configuration of an air conditioner connection system in a first embodiment.

FIG. 1 is a diagram illustrating an example of a system configuration of an air conditioner connection system according to a first embodiment. An air conditioner connection system 1000 illustrated in FIG. 1 is a system that performs power carrier communication, in which a power line 3 for supplying electric power to a house is used as a communication line. The power carrier communication may also be referred to as a PLC (Power Line Communication), a PLT (Power Line Telecommunication), a power line communication, a high-speed power line communication or an electric light line communication, and typically, the power carrier communication is a technique that uses a power wiring installed in a house or an office as a communication line for full duplex communication having a configuration of a bus type network. Further, in the power carrier communication, it is possible to adopt various kinds of modulation systems including orthogonal frequency domain multiplex (OFDM) using a fast Fourier transform and a wavelet transform, a frequency spread (spread spectrum: SS) capable of reducing a rate reduction caused by an influence of noises, and a discrete multi-frequency (DMT system).

As illustrated in FIG. 1, an air conditioner connection system 1000 is configured to include: a router 10 that connects Internet 1 and a home LAN (local area network) 2; a PLC base unit 20 that is connected to the Internet 1 via the home LAN 2 in a communication-capable manner; an air conditioner 100 having a PLC slave unit module 110 connected to the PLC base unit 20 via the power line 3 in a communication-capable manner; and a remote control device 200 capable of performing wireless radio communication with the air conditioner 100. The Internet 1 is one example of an external network. The home LAN 2 is one example of a home network. The PLC base unit 20 is one example of the third device. The PLC slave unit module 110 is one example of the first device. The remote control device 200 is one example of the second device.

The home LAN 2 connects home devices, such as electronic devices and electrical devices placed in the house, in an intercommunicatable state, and connects the home devices and the Internet 1 in a communication-capable state. The power line 3 is connected to an external power source terminal provided in the house to supply the power supplied from a commercial power source to the home devices. The power line 3 supplies a carrier wave on which a communication signal is superimposed to the home devices. The communication signal includes a data signal concerning a call, transmission and reception of an e-mail, and an Internet communication.

The PLC base unit 20 has a built-in LAN router function and is connected to the home LAN 2. The PLC base unit 20 includes an authentication start button 21 that is manually operated when starting up the PLC with the air conditioner 100. The PLC base unit 20 shifts to an authentication mode that is capable of performing the authentication process (hereinafter, appropriately referred to as a "PLC authentication process") for performing the communication using the PLC (hereinafter, appropriately referred to as a "PLC communication") with the PLC slave unit module 110 for a predetermined time after receiving an operation of the authentication start button 21.

Figure 2:
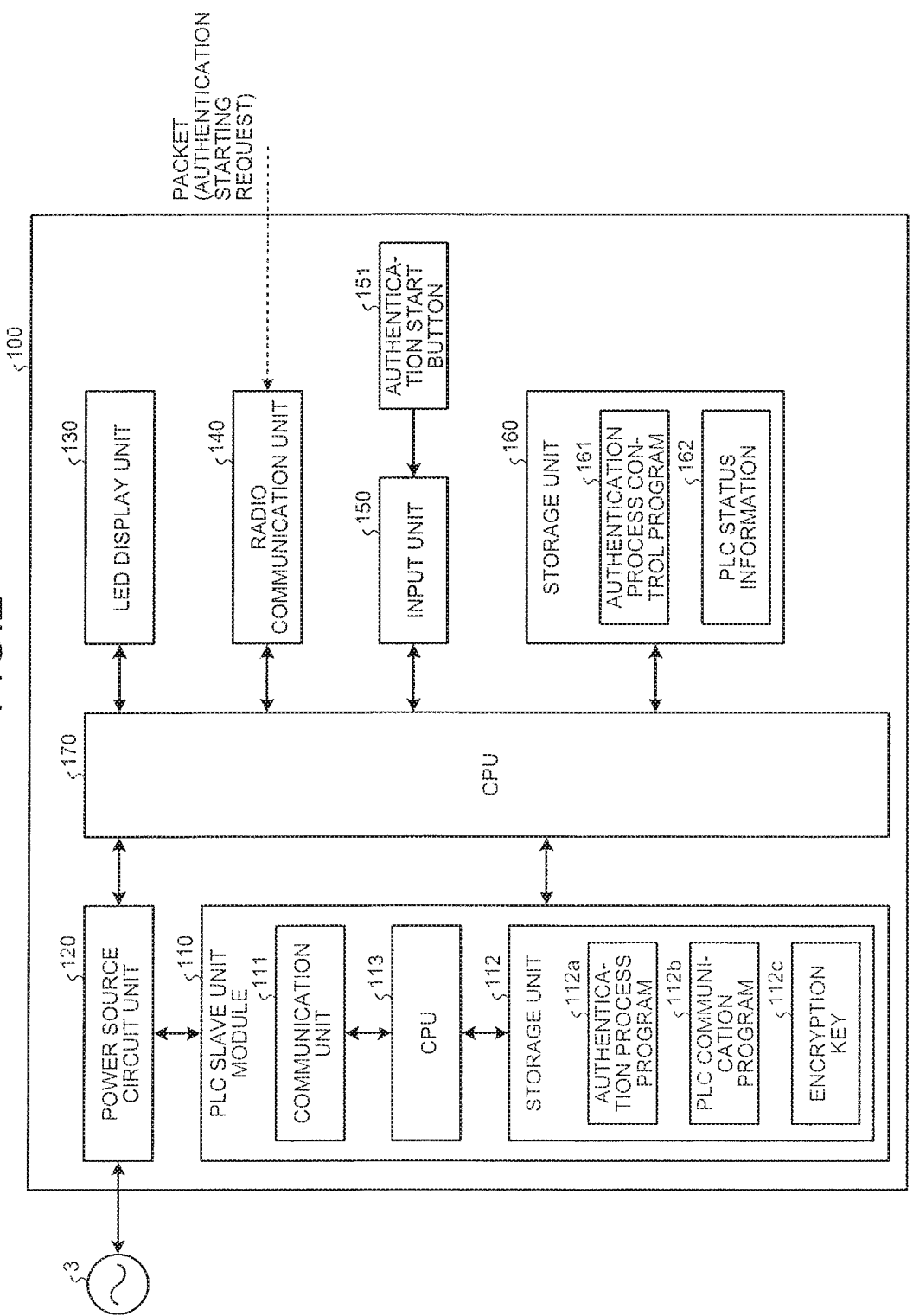
FIG. 2 is a block diagram illustrating an example of a functional configuration of an air conditioner according to the first embodiment.

The air conditioner 100 is an indoor unit installed in a house. FIG. 2 is a block diagram illustrating an example of a functional configuration of an air conditioner according to the first embodiment. As illustrated in FIG. 2, the air conditioner 100 includes: a PLC slave unit module 110 that performs the PLC authentication process; a power source circuit unit 120 that connects the power line 3 and the PLC slave unit module 110; an LED display unit 130 that turns a plurality of LEDs (light emitting diodes) on; a radio communication unit 140 that receives various kinds of data from the remote control device 200 by radio communication; an input unit 150 that receives various kinds of inputs; an authentication start button 151 that accepts a manual operation for starting up the PLC authentication process; a storage unit 160 that stores programs and data used for various kinds of processes performed in the air conditioner 100; and a central process unit (CPU) 170 that performs various kinds of processes for the air conditioner 100.

As illustrated in FIG. 2, the PLC slave unit module 110 includes a communication unit 111 that communicates with the PLC base unit 20, a storage unit 112 that stores program and data used for various processes performed in the PLC slave unit module 110, and a CPU 113 that performs various processes in the PLC slave unit module 110. When the PLC slave unit module 110 is not performing the process of the PLC communication and the PLC authentication process, the PLC slave unit module 110 operates, for example, in a standby mode for being ready for the PLC communication and the PLC authentication process.

The storage unit 112 stores an authentication process program 112a, a PLC communication program 112b and an encryption key 112c. The authentication process program 112a provides a function for performing the PLC authentication process with the PLC base unit 20. The PLC communication program 112b provides a function for performing the PLC communication. The encryption key 112c is a key for encrypting the data exchanged in the PLC communication when the authentication process is performed successfully using the authentication process program 112a, and is shared with the PLC base unit 20.

The CPU 113 performs the PLC authentication process with the PLC base unit 20 by executing the authentication process program 112a. When receiving an instruction to shift to the authentication mode from the CPU 170, the CPU 113 shifts from the standby mode to the authentication mode for starting the PLC authentication process, reads the authentication process program 112a from the storage unit 112, and starts the authentication process with the PLC base unit 20. When the authentication process is completed, the CPU 113 sends the result of the authentication process to the CPU 170. When the authentication is successful, the CPU 113 stores the encryption key 112c shared with the PLC base unit 20 in the storage unit 112. Further, the PLC authentication process performed between the PLC slave unit module 110 and the PLC base unit 20 achieves success when the PLC base unit 20 is in process of operating in a mode in which the PLC authentication process can be executed. The CPU 113 that performs the authentication process program 112a is one example of the authentication process unit.

The power source circuit unit 120 connects the PLC slave unit module 110 and the PLC base unit 20 via the power line 3 in a state in which the PLC communication can be realized. The power source circuit unit 120 converts the communication signal that is superimposed on a carrier wave supplied via the power line 3, into a signal that can be received by the PLC slave unit module 110.

The LED display unit 130 turns on the LEDs in a pattern corresponding to the authentication result of the PLC authentication process. The radio communication unit 140 receives a packet including an authentication starting request from the remote control device 200. The input unit 150 receives an operation of the authentication start button 151 as an input for request of the authentication starting. The authentication start button 151 is an operation part for manually executing the authentication starting request, instead of transmitting the authentication starting request from the remote control device 200, and the authentication start button 151 is never usually used in the case where the authentication starting request is transmitted by the remote control device 200.

The storage unit 160 stores the authentication process control program 161 and the PLC status information 162. The authentication process control program 161 provides a function for controlling the PLC slave unit module 110 to perform the PLC authentication process with the PLC base unit 20. The PLC status information 162 contains a result of the authentication process provided by the PLC slave unit module 110. The authentication result included in the PLC status information 162 is referred to by the CPU 170 when determining the lighting pattern of the LED display unit 130. In addition, the PLC status information 162 includes information about the PLC base unit 20. The information of the PLC base unit 20 included in the PLC status information 162 is used, for example, for a process of resuming the PLC communication automatically performed by the CPU 170 at the time of power activation for recovery from a power failure in the case of the power failure occurring and the supply of power being cut off.

The CPU 170 controls the PLC slave unit module 110 to perform the PLC authentication process by executing the authentication process control program 161. Specifically, when receiving a packet from the remote control device 200, the CPU 170 determines whether the received packet is a packet concerning operation control of the air conditioner 100 or a packet concerning the PLC authentication process. When the received packet relates to the authentication starting request, the CPU 170 sends the instruction to shift to the authentication mode to the PLC slave unit module 110. The CPU 170 determines a lighting pattern of the LED display unit 130 on the basis of the result of the authentication process included in the PLC status information 162, and accordingly turns the LED display unit 130 on. The CPU 170 that executes the authentication process control program 161 is one example of an authentication process control unit.

Figures 3, 4:
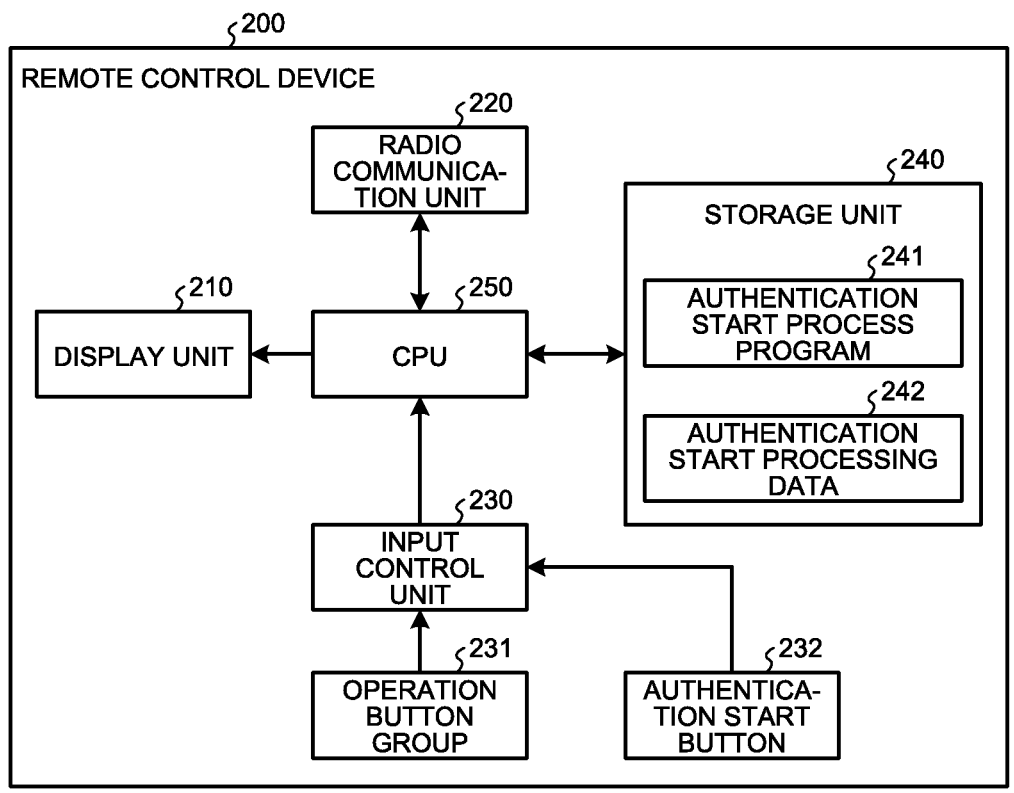
FIG. 3 is a chart showing an example of a configuration of a received packet according to the first embodiment.
FIG. 4 is a block diagram illustrating an example of a functional configuration of a remote control device according to the first embodiment.

FIG. 3 is a chart illustrating a configuration example of a received packet according to the first embodiment. As illustrated in FIG. 3, the received packet is configured to include a command type indicating a content of a command, a data part size indicating the size of data inserted into a data part, a data part in which data are inserted, and a check code for checking the integrity of the data stored in the data part. The CPU 170 determines whether the packet is a packet concerning the operation control of the air conditioner 100 or a packet concerning the PLC authentication process on the basis of a value stored in a region of the command type of the received packet. The CPU 170 determines the rearmost section of the data stored in the region of the data part on the basis of the value stored in the region of the data part size of the received packet. The CPU 170 acquires a starting request of the PLC authentication process and a set value concerning the PLC authentication process from the data part of the received packet. The CPU 170 determines whether the data stored in the region of the data part is authentic, by comparing a calculated value from the data stored in the data part of the received packet with a value stored in the region of the check code. A two's complement of a sum (byte sum) of the data stored in the data part is stored in the region of the check code. The CPU 170 discards the received packet when the data stored in the region of the data part are unauthentic. FIG. 3 is one example of the received packet, and the invention is not limited to the example illustrated in FIG. 3. In order to reduce a packet size of the received packet, the data may be allocated bit-by-bit. As the check code stored in the region of the check code is not limited to the two's complement of the byte sum of the data part, it is possible to adopt any check codes capable of determining whether the data stored in the region of the data part are authentic.

FIG. 4 is a block diagram illustrating an example of a functional configuration of the remote control device according to the first embodiment. As illustrated in FIG. 4, the remote control device 200 includes a display unit 210 that displays various types of information, a radio communication unit 220 that performs radio communication, an input control unit 230 that controls inputs from an operation button group 231 and an authentication start button 232, a storage unit 240 that stores programs and data used for various kinds of processes in the remote control device 200, and a CPU 250 that executes various kinds of processes in the remote control device 200.

Figure 5:
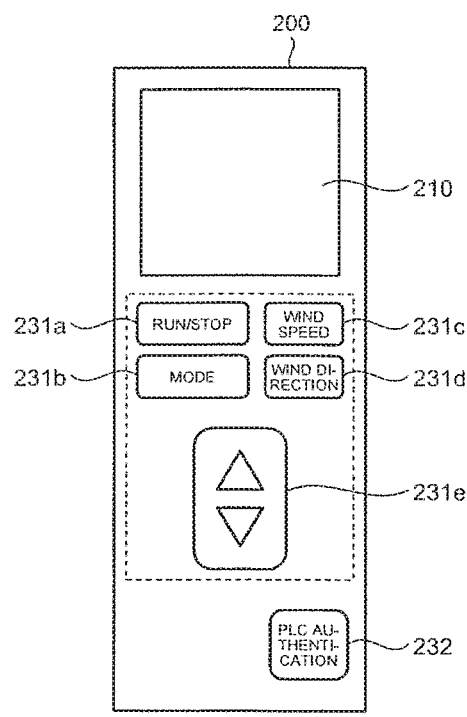
FIG. 5 is an illustration showing an example of an appearance configuration of the remote control device according to the first embodiment.

The display unit 210 displays information about the operation control of the air conditioner 100. The radio communication unit 220 transmits a packet concerning the operation control of the air conditioner 100 and a packet concerning the PLC communication. The input control unit 230 sends an input signal corresponding to the manual operation of the operation button group 231 and an input signal corresponding to the manual operation of the authentication start button to the CPU 250. FIG. 5 is an illustration showing an example of an appearance configuration of a remote control device according to the first embodiment. As illustrated in FIG. 5, a casing of the remote control device 200 is provided with a button 231a for performing a driving operation and a stopping operation of the air conditioner 100, a button 231b for performing a switching operation of the operation mode of the air conditioner 100, a button 231c for performing an adjusting operation of the wind power from the air conditioner 100, a button 231d for performing an adjusting operation of the wind direction from the air conditioner 100, and a button 231e for performing selection for the various operations in the air conditioner 100, as an operation button group 231. The casing of the remote control device 200 is provided with an authentication start button 232 for transmitting a starting request of the PLC authentication process to the air conditioner 100 independently of the operation button group 231.

The storage unit 240 stores the authentication start process program 241 and the authentication start processing data 242. When receiving the operation of the authentication start button 232, the authentication start process program 241 provides a function for generating a PLC authentication processing packet including a starting request of the PLC authentication process and transmitting the packet to the air conditioner 100. The authentication start processing data 242 are constructed of data necessary for generation of the PLC authentication processing packet.

The CPU 250 executes the authentication start process program 241 thereby to generate a packet including a starting request of the PLC authentication process and transmit the packet to the air conditioner 100. Specifically, when receiving an operation of the authentication start button 232, the CPU 250 uses the authentication start processing data 242 to generate a PLC authentication processing packet. The CPU 250 transmits the PLC authentication processing packet to the air conditioner 100 via the radio communication unit 220. The CPU 250 that executes the authentication start process program 241 is one example of the authentication start process unit.

Figure 6:
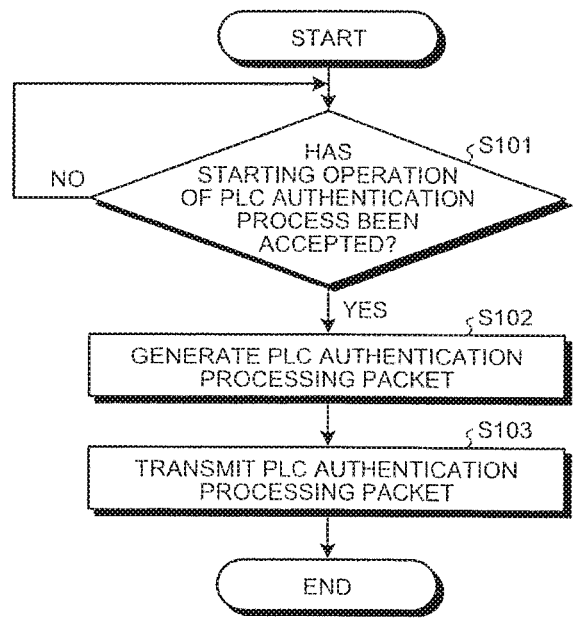
FIG. 6 is a flowchart showing a flow of a process performed in the air conditioner connection system according to the first embodiment.
Figure 7:
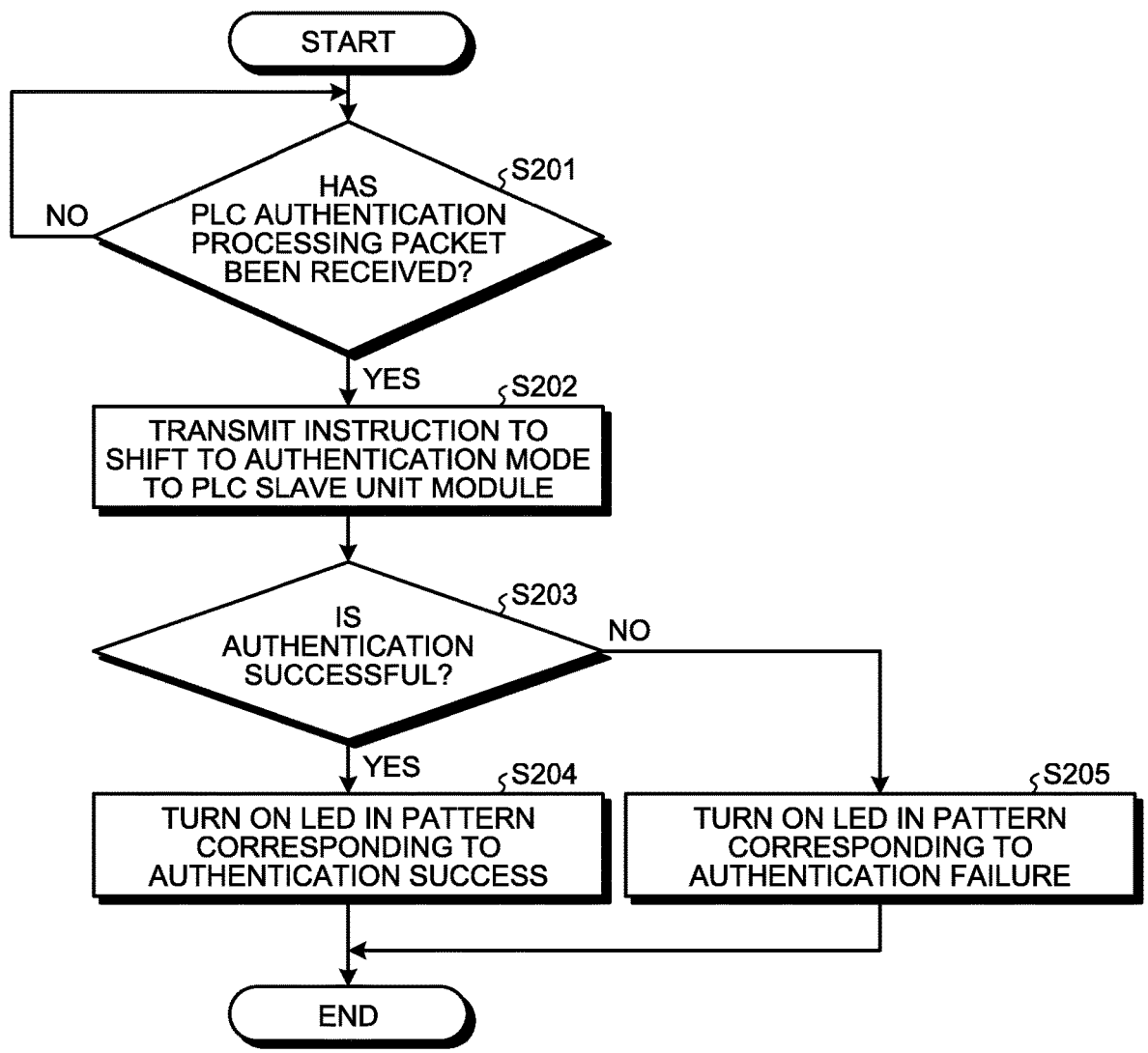
FIG. 7 is a flowchart showing a flow of the process performed in the air conditioner connection system according to the first embodiment.
Figure 8:
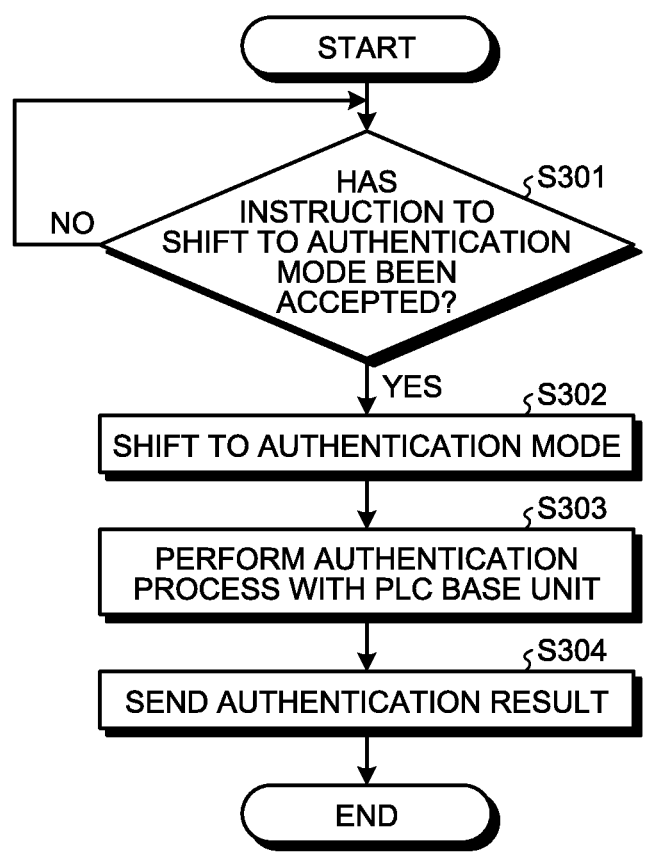
FIG. 8 is a flowchart showing a flow of the process performed in the air conditioner connection system according to the first embodiment.

The flow of a process performed in the air conditioner connection system according to the first embodiment will be described with reference to FIGS. 6 to 8. FIGS. 6 to 8 are flowcharts showing the flow of the process performed in the air conditioner connection system according to the first embodiment.

The flow of a process using the remote control device 200 will be described with reference to FIG. 6. The process shown in FIG. 6 is realized by the CPU 250 executing the authentication start process program 241 stored in the storage unit 240. As shown in FIG. 6, the remote control device 200 determines whether the starting operation of the PLC authentication process has been received (step S101). That is, the remote control device 200 determines whether the operation of the authentication start button 232 has been received.

When the starting operation of the PLC authentication process has not been received (No in step S101) as a result of the determination, the remote control device 200 repeats the same determination step. In contrast, when the starting operation of the PLC authentication process has been received (Yes in step S101) as a result of the determination, the remote control device 200 generates the PLC authentication processing packet (step S102). Subsequently, the remote control device 200 transmits the PLC authentication processing packet generated in step S102 to the air conditioner 100 (step S103), and terminates the process illustrated in FIG. 6.

The flow of the process of the air conditioner 100 will be described with reference to FIG. 7. The process shown in FIG. 7 is realized by the CPU 170 executing the authentication process control program 161 stored in the storage unit 160. As shown in FIG. 7, the air conditioner 100 determines whether the PLC authentication processing packet has been received (step S201). That is, the air conditioner 100 refers to the command type of the received packet to determine whether the received packet is a packet concerning the PLC authentication process.

When the PLC authentication processing packet has not been received (No in step S201) as a result of the determination, the air conditioner 100 repeats the same determination step. In contrast, when the PLC authentication processing packet has been received (Yes in step S201) as a result of the determination, the air conditioner 100 sends the instruction to shift to the authentication mode to the PLC slave unit module 110 (step S202).

Subsequently, the air conditioner 100 determines whether the PLC authentication has been successful on the basis of the result of the authentication process transmitted from the PLC slave unit module 110 (step S203).

When the PLC authentication has been successful (Yes in step S203) as a result of the determination, the air conditioner 100 turns the LEDs of the LED display unit 130 on in a pattern corresponding to the authentication success (step S204), and terminates the process illustrated in FIG. 7. In contrast, when the PLC authentication has not been successful (in the case of a failure) (No in step S203) as a result of the determination, the air conditioner 100 turns the LEDs of the LED display unit 130 on in a pattern corresponding to the authentication failure (step S205), and terminates the process illustrated in FIG. 7.

The flow of the process of the PLC slave unit module 110 will be described with reference to FIG. 8. The process shown in FIG. 8 is realized by the CPU 113 executing an authentication process program 112a stored in the storage unit 112 through the CPU 113. As shown in FIG. 7, the PLC slave unit module 110 determines whether an instruction to shift to the authentication mode has been received (step S301).

When the instruction to shift to the authentication mode has not been received (No in step S301) as a result of the determination, the PLC slave unit module 110 repeats the same determination step. In contrast, when the instruction to shift to the authentication mode has been received (Yes in step S301) as a result of the determination, the PLC slave unit module 110 is shifted from the standby mode to the authentication mode for starting the PLC authentication process (step S302).

Subsequently, the PLC slave unit module 110 performs the PLC authentication process with the PLC base unit 20 (step S303). When the PLC authentication process is completed, the PLC slave unit module 110 sends the authentication result of the PLC authentication process to the CPU 170 (step S304), and terminates the process illustrated in FIG. 8.

According to the first embodiment, in the air conditioner connection system 1000, a user can start the PLC authentication process by operating the remote control device 200, without directly touching the PLC slave unit module 110. Therefore, for example, for the installation type device installed at a high location in the house, such as the air conditioner 100, the PLC authentication process can be easily executed when making the connection thereof in power carrier communication. Further, according to the first embodiment, as long as it is within a range in which the radio communication using the remote control device 200 is available, the PLC authentication process can be started from a remote place. Therefore, there is also an advantageous effect whereby it is possible to perform an initial work at the time of installation, without requiring a user to come and go between the air conditioner 100 and the PLC base unit 20.

Second Embodiment

Hereinafter, in a second embodiment, an example of setting a starting time of the PLC authentication process in the remote control device 200 will be described.

Figures 9, 10:
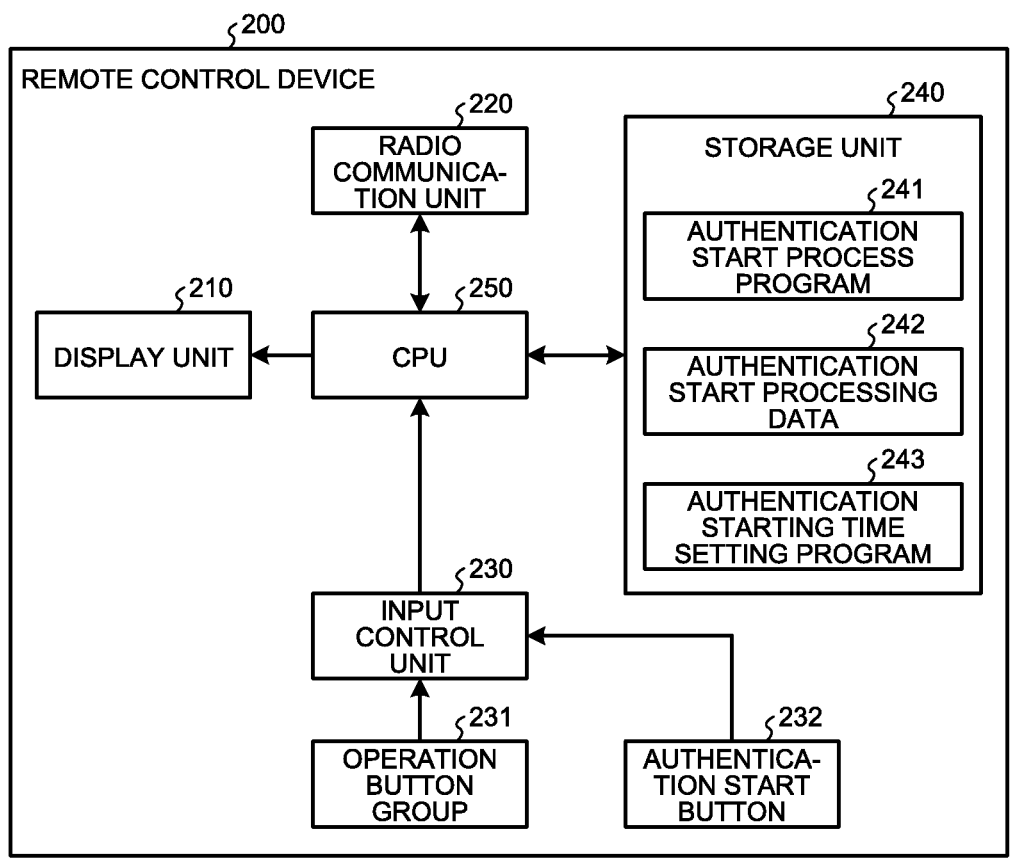
FIG. 9 is a block diagram illustrating a functional configuration of a remote control device according to a second embodiment.
FIG. 10 is a chart showing an example of a configuration of an incoming packet according to the second embodiment.

FIG. 9 is a block diagram illustrating a functional configuration of a remote control device according to the second embodiment. A remote control device 200 according to the second embodiment is different from the first embodiment in some aspects as described below. That is, the storage unit 240 stores an authentication starting time setting program 243. The authentication starting time setting program 243 provides a function for accepting the setting of the starting time of the PLC authentication process from the user. The authentication starting time setting program 243 provides a function for counting-down and displaying, on the display unit 210, the remaining time before reaching the starting time of the PLC authentication process when the starting time of the PLC authentication process is established by the user. Further, the authentication start process program 241 provides a function for transmitting the PLC authentication processing packet including the starting time of the PLC authentication process to the air conditioner 100 when the starting time of the PLC authentication process is established by the user through the function provided by the authentication starting time setting program 243.

The CPU 250 performs the process concerning the setting of the starting time of the PLC authentication process, by executing the authentication starting time setting program 243. Specifically, when receiving the operation of the authentication start button 232, the CPU 250 executes a starting operation mode of the PLC authentication process that allows the user to make a setting operation of the starting time of the PLC authentication process. Subsequently, when receiving an establishment operation of the starting time of the PLC authentication process, the CPU 250 counts down and displays, on the display unit 210, the remaining time before reaching the starting time of the PLC authentication process. Further, when receiving the establishment operation of the starting time of the PLC authentication process by executing the authentication start process program 241, the CPU 250 transmits the PLC authentication processing packet including the starting time of the PLC authentication process to the air conditioner 100. The CPU 250 that executes the authentication starting time setting program 243 is one example of a time setting unit.

When receiving the PLC authentication processing packet, in a case where the starting time of the PLC authentication process is set, the authentication process control program 161 stored in the storage unit 160 of the air conditioner 100 provides a function for sending the instruction to shift to the authentication mode to the PLC slave unit module 110 after waiting for the arrival of the set starting time.

When the starting time of the PLC authentication process is set in the received PLC authentication processing packet, the CPU 170 sends an instruction to shift to the authentication mode to the PLC slave unit module 110 after waiting for the arrival of the set starting time by executing the authentication process control program 161.

FIG. 10 is a chart showing a configuration example of a received packet according to the second embodiment. As shown in FIG. 10, in the received packet according to the second embodiment, in addition to the configuration shown in FIG. 3, the data part has a region for storing the starting time of the PLC authentication process. The CPU 170 refers to the starting time stored in the data part to keep the sending of the instruction to shift to the authentication mode to the PLC slave unit module 110 to be on standby until it reaches the set starting time, by referring to the starting time.

Figure 11:
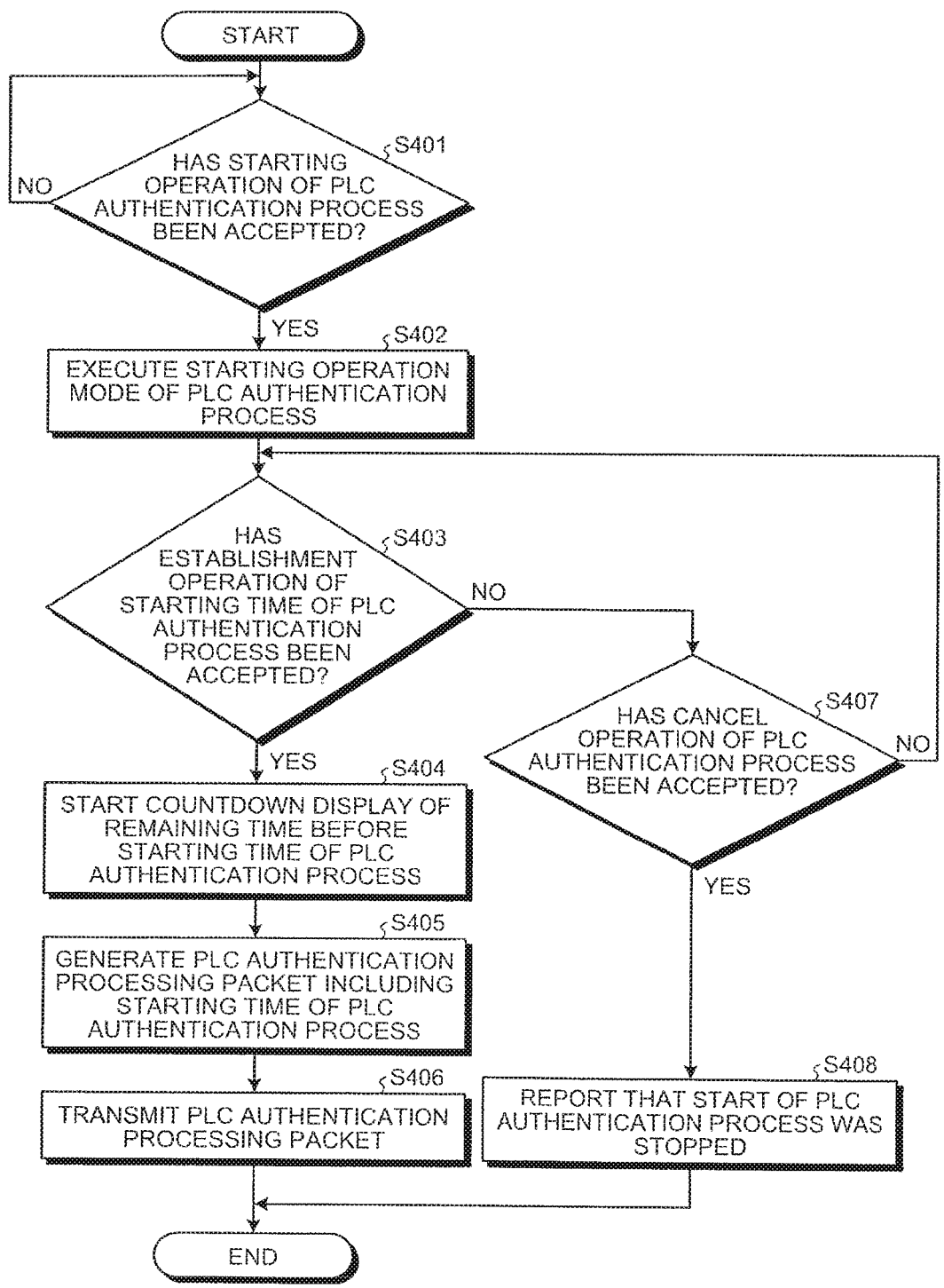
FIG. 11 is a flowchart showing a flow of a process performed in an air conditioner connection system according to the second embodiment.
Figure 12:
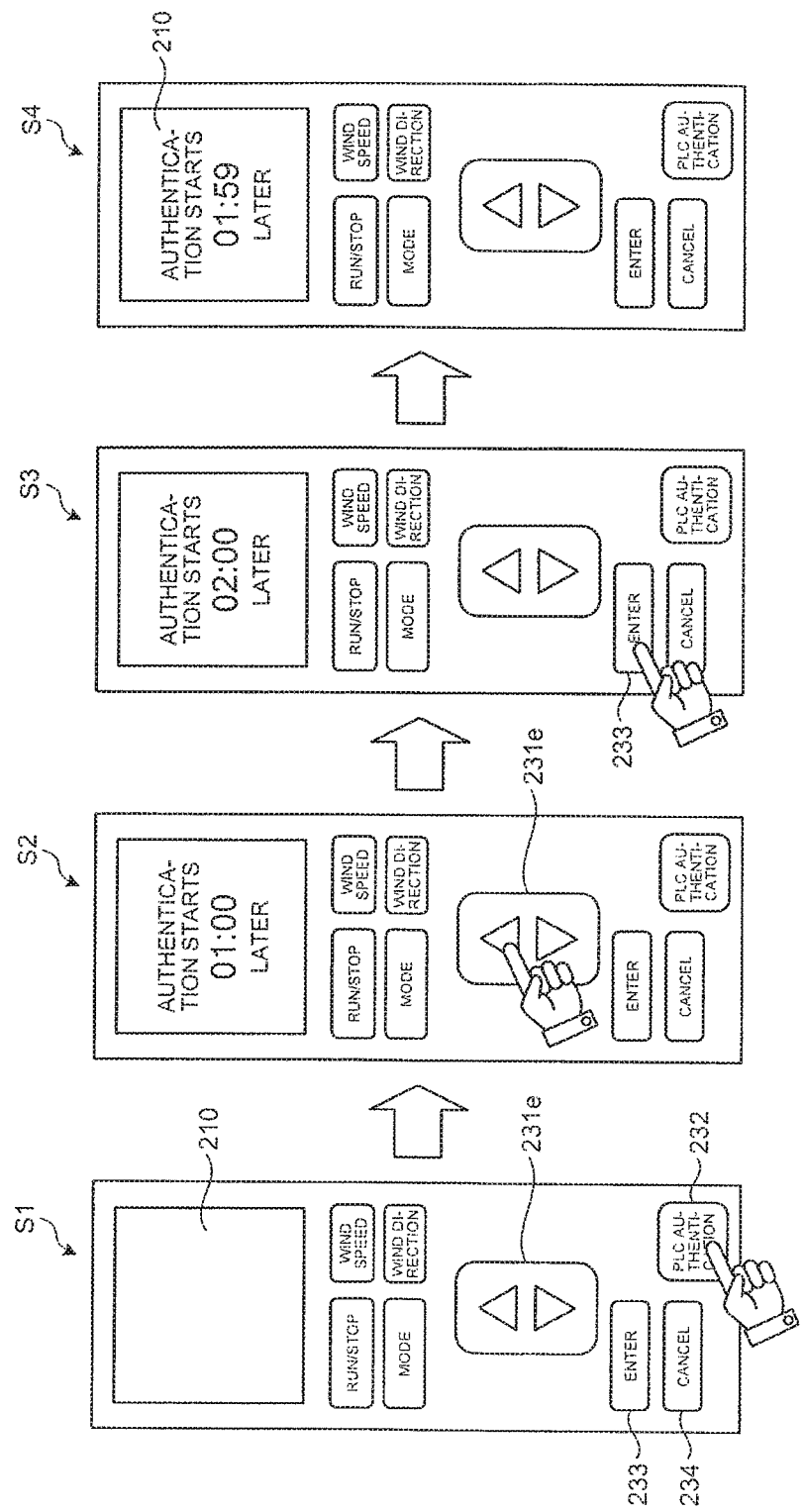
FIG. 12 is an illustration showing an operation example of the remote control device according to the second embodiment.
Figure 13:
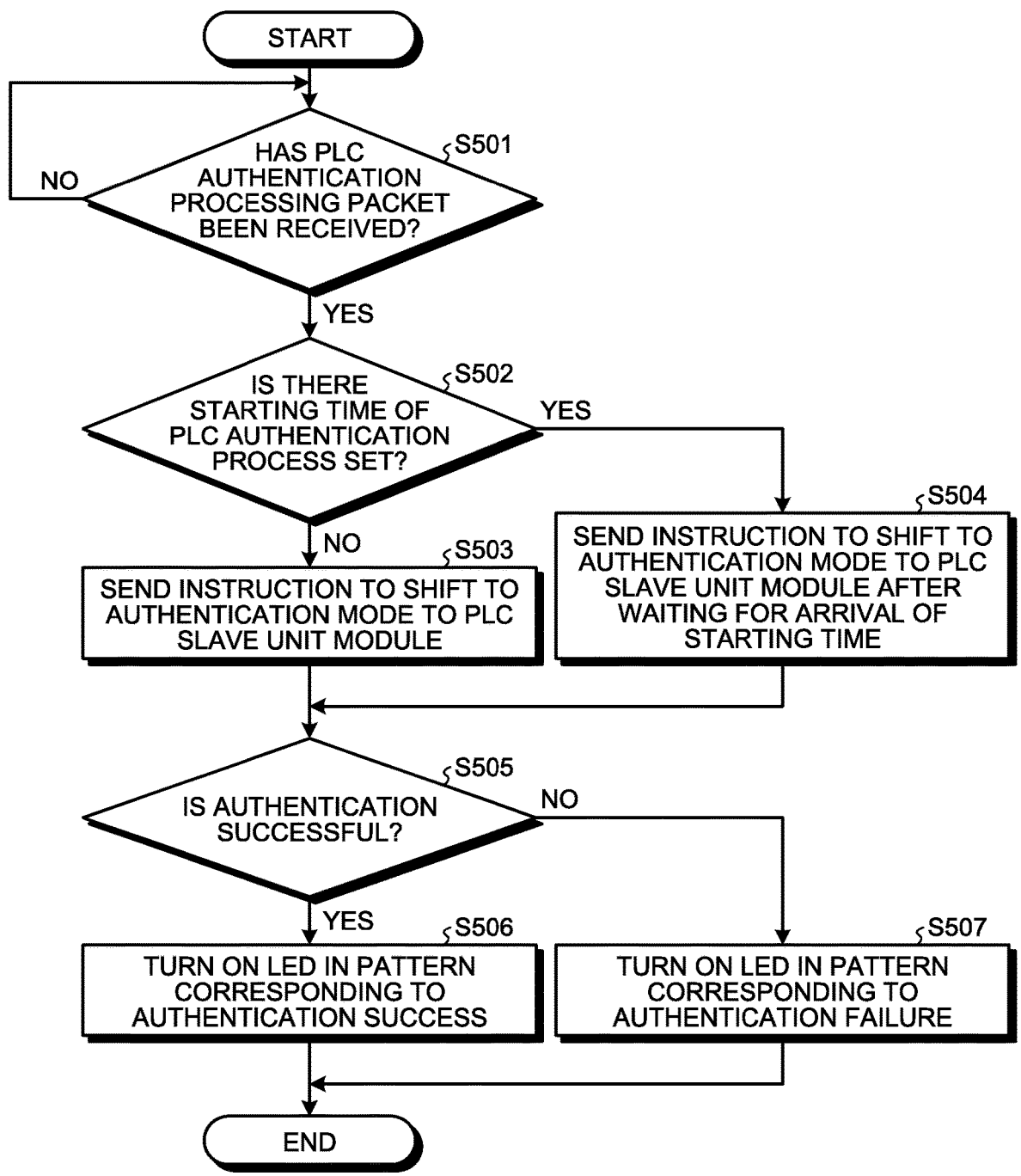
FIG. 13 is a flowchart showing a flow of the process performed in the air conditioner connection system according to the second embodiment.

A flow of the process performed in the air conditioner connection system according to the second embodiment will be described with reference to FIGS. 11 to 13. FIGS. 11 and 13 are flowcharts showing the flow of the process performed in the air conditioner connection system according to the second embodiment. FIG. 12 is an illustration showing an operational example of the remote control device according to the second embodiment.

The flow of the process of the remote control device 200 will be described with reference to FIGS. 11 and 12. The process shown in FIG. 11 is realized by the CPU 250 executing the authentication start process program 241 and the authentication starting time setting program 243 stored in the storage unit 240. As illustrated in FIG. 11, the remote control device 200 determines whether the starting operation of the PLC authentication process has been received (step S401). That is, the remote control device 200 determines whether the operation of the authentication start button 232 has been accepted (see step S1 illustrated in FIG. 12).

When the starting operation of the PLC authentication process has not been received (No in step S401) as a result of the determination, the remote control device 200 repeats the same determination step. In contrast, when the starting operation of the PLC authentication process has been received (Yes in step S401) as a result of the determination, the remote control device 200 executes the starting operation mode that allows the user to make a setting operation of the starting time of the PLC authentication process (step S402).

Next, the remote control device 200 determines whether the establishment operation of the starting time of the PLC authentication process has been received (step S403). That is, the remote control device 200 determines whether the establishment operation of the button 233 has been accepted, after the setting operation of the starting time using the button 231e (see step S2 to step S3 illustrated in FIG. 12).

When the establishment operation of the starting time of the PLC authentication process has been received (Yes in step S403) as a result of the determination, the remote control device 200 starts the countdown display of the remaining time before reaching the starting time of the PLC authentication process (step S404). For example, when the starting time of the PLC authentication process is 2 minutes, the remote control device 200 counts down and displays the remaining time before the start of PLC authentication process on the display unit 210, from the time immediately after the operation of the button 233 (see step S4 illustrated in FIG. 12).

Next, the remote control device 200 generates a PLC authentication processing packet including the starting time of the PLC authentication process (step S405).

Next, the remote control device 200 transmits the PLC authentication processing packet generated in step S405 to the air conditioner 100 (step S406), and terminates the process illustrated in FIG. 11.

In the above step S403, when the establishment operation of the starting time of the PLC authentication process has not been received (No in step S403) as a result of the determination, the remote control device 200 determines whether a cancel operation of the PLC authentication process has been received (step S407). That is, the remote control device 200 determines whether the operation of the button 234 has been accepted (see FIG. 12).

When the cancel operation of the PLC authentication process has not been received (No in step S407) as a result of the determination, the remote control device 200 returns to the processing procedure of the step S403. In contrast, when the cancel operation of the PLC authentication process has been received (Yes in step S407) as a result of the determination, the remote control device 200 reports that the start of the PLC authentication process is stopped (step S408), and terminates the process illustrated in FIG. 11. For example, when accepting the operation of the button 234 before accepting the operation of the button 233, the remote control device 200 displays a message indicating the stoppage of the PLC authentication process on the display unit 210.

The flow of the process of the air conditioner 100 will be described with reference to FIG. 13. The process illustrated in FIG. 13 is realized by the CPU 170 executing the authentication process control program 161 stored in the storage unit 160. As illustrated in FIG. 13, the air conditioner 100 determines whether the PLC authentication processing packet has been received (step S501). That is, the air conditioner 100 refers to the command type of the received packet to determine whether the received packet is a packet concerning the PLC authentication process.

When the PLC authentication processing packet has not been received (No in step S501) as a result of the determination, the air conditioner 100 repeats the same determination step. In contrast, when the PLC authentication processing packet has been received (Yes in step S501) as a result of the determination, the air conditioner 100 determines whether the starting time of the PLC authentication process is set (step S502). That is, the air conditioner 100 refers to a data part of the received packet to determine whether the setting of the starting time of the PLC authentication process is included in the data part.

When there is no setting of the starting time of the PLC authentication process as a result of the determination (No in step S502), the air conditioner 100 sends the instruction to shift to the authentication mode to the PLC slave unit module 110 (step S503). In contrast, when there is certain setting of the starting time of the PLC authentication process as a result of the determination (Yes in step S502), the air conditioner 100 waits for the arrival of the set starting time, and sends an instruction to shift to the authentication mode to the PLC slave unit module 110 (step S504).

Next, the air conditioner 100 determines whether the PLC authentication is successful on the basis of the result of the authentication process sent from the PLC slave unit module 110 (step S505).

When the PLC authentication is successful as a result of the determination (Yes in step S505), the air conditioner 100 turns the LEDs of the LED display unit 130 on in a pattern corresponding to the authentication success (step S506), and terminates the process illustrated in FIG. 13. In contrast, when the PLC authentication is not successful (in the case of a failure) as a result of the determination (No in step S505), the air conditioner 100 turns the LEDs of the LED display unit 130 on in a pattern corresponding to the authentication failure (step S507), and terminates the process illustrated in FIG. 13.

According to the second embodiment, when a user sets the starting time of the PLC authentication process using the remote control device 200, the PLC authentication process is performed between the PLC slave unit module 110 and the PLC base unit 20 after the elapse of the set starting time. Thus, for example, even when there is a need to set the PLC base unit 20 and the PLC slave unit module 110 in a state in which the PLC authentication process is allowed simultaneously or within a few seconds, it is possible to provide a temporal margin and to easily perform the PLC authentication process. Further, by counting-down and displaying the remaining time before the start of the PLC authentication process on the remote control device 200, it is possible to easily make timing for shifting the PLC base unit 20 to a mode in which the PLC authentication process is executable.

Third Embodiment

Figure 14:
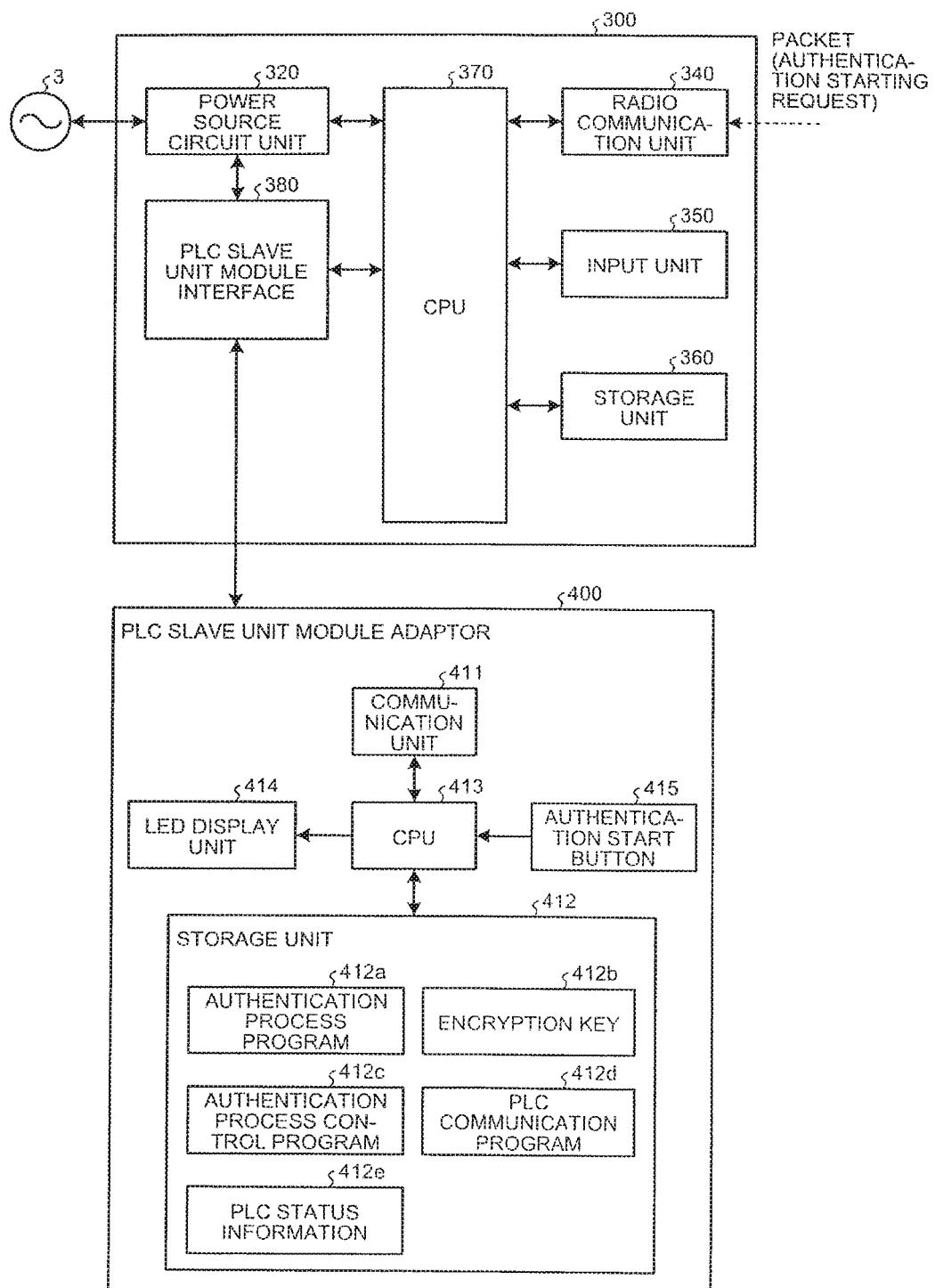
FIG. 14 is a block diagram illustrating an example of a functional configuration of an air conditioner and a PLC slave unit module adapter according to a third embodiment.

Hereinafter, in a third embodiment, description will be given for a case where the PLC slave unit module 110 of the air conditioner 100 is configured to be externally provided. FIG. 14 is a block diagram illustrating an example of a functional configuration of an air conditioner and a PLC slave unit module adapter according to the third embodiment. As illustrated in FIG. 14, an air conditioner 300 according to the third embodiment includes: a power source circuit unit 320 that connects the power line 3 and a PLC slave unit module interface 380; a radio communication unit 340 that receives various data from the remote control device 200 by radio communication; an input unit 350 that receives various inputs; a storage unit 360 that stores programs and data used for various processes performed in the air conditioner 300; a CPU 370 that performs various processes for the air conditioner 300; and the PLC slave unit module interface 380 connected to the power source circuit unit 320 and the CPU 170.

The PLC slave unit module interface 380 provides a connection connector to be coupled to the PLC slave unit module adapter. The connection connector is configured to include a power source line for PLC communication, transmission and reception lines for controlling the PLC slave unit module interface 380, a power source supply line to the PLC slave unit module adapter 400, and a ground (GND).

When performing the PLC communication, the CPU 370 transmits the control data for controlling the PLC slave unit module interface 380 and the transmission data to be transmitted to the PLC base unit 20, to the PLC slave unit module adapter 400 via the PLC slave unit module interface 380. The configuration of the control data and the transmission data are not limited to the particular configuration, and may be a configuration having a single communication packet including control data and transmission data, or may be a configuration having their respective individual packets.

The PLC slave unit module adapter 400 is configured to have all the functions provided in the PLC slave unit module 110 described in the first embodiment, and a part of the functions provided in the air conditioner 100 described in the first embodiment. That is, the PLC slave unit module adapter 400 includes: a communication unit 411 that communicates with the PLC base unit 20; a storage unit 412 that stores programs and data used for various processes performed in the PLC slave unit module 110; a CPU 413 that performs various processes in the PLC slave unit module 110; an LED display unit 414 that turns a plurality of LEDs on; and an authentication start button 415 that receives a manual operation for starting the PLC authentication process.

The storage unit 412 stores an authentication process program 412a corresponding to the authentication process program 112a, an encryption key 412b corresponding to the encryption key 112c, an authentication process control program 412c corresponding to the authentication process control program 161, a PLC communication program 412d corresponding to the PLC communication program 112b, and a PLC status information 412e corresponding to the PLC status information 162.

When the PLC authentication processing packet is received from the air conditioner 300 via the PLC slave unit module interface 380, the authentication process control program 412c provides a function of determining whether the starting time of the PLC authentication process is set in the PLC authentication processing packet, and when the starting time is set, waiting for the arrival of the set starting time and shifting to the authentication mode. The PLC communication program 412d provides a function of superimposing the transmission data received from the air conditioner 300 on the power line based on the control data received from the air conditioner 300, and transmitting the data to the PLC base unit 20 from the PLC slave unit module interface 380 via the power source circuit unit 320 and the power line 3, by PLC communication.

When receiving the PLC authentication processing packet by executing the authentication process control program 412c, the CPU 413 determines whether the starting time of the PLC authentication process is set in the PLC authentication processing packet, and when the starting time is set, the CPU 413 waits for the arrival of the set starting time and shifts to the authentication mode.

Figure 15:
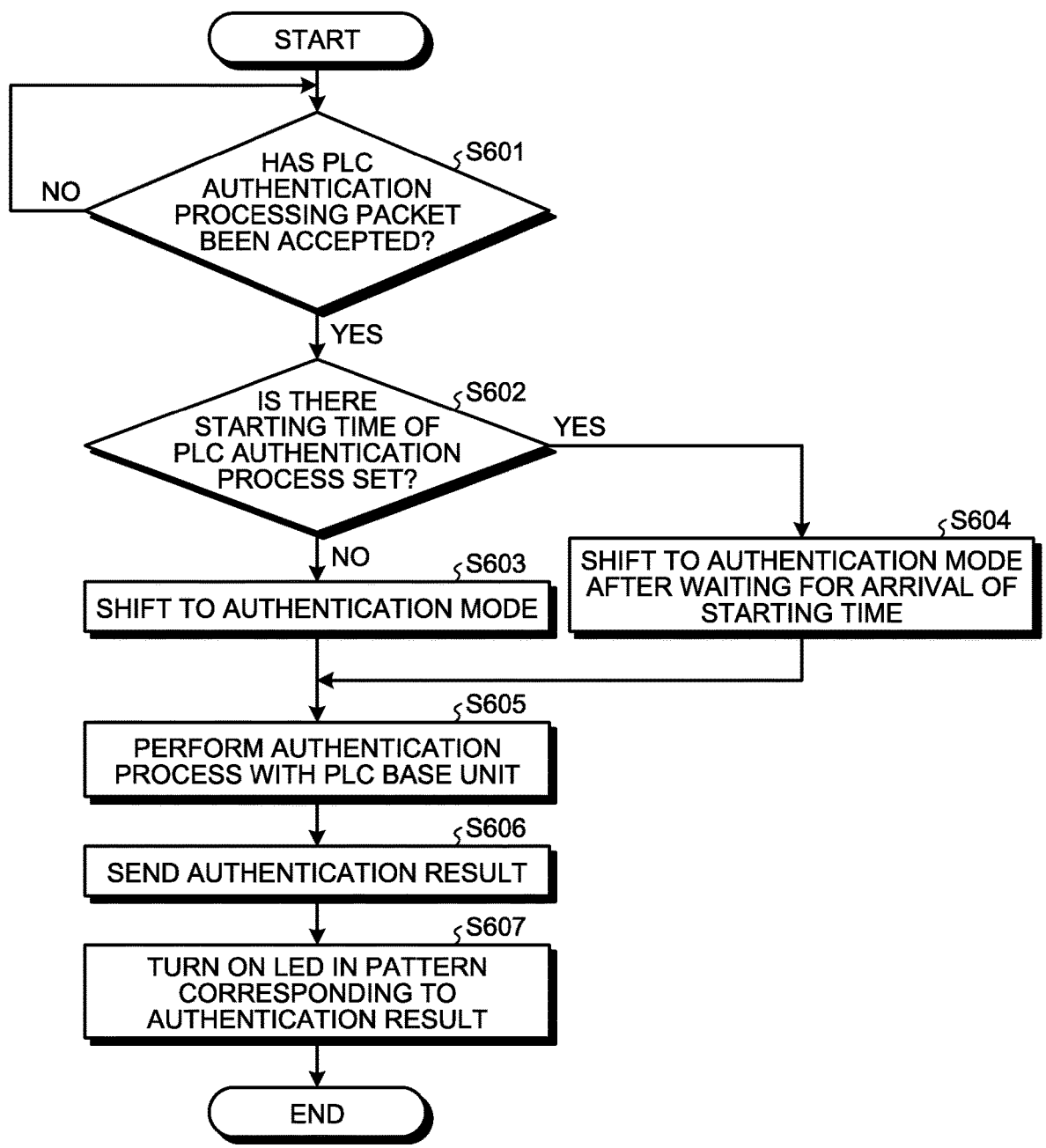
FIG. 15 is a flowchart showing a flow of the process in an air conditioner connection system according to the third embodiment.

The flow of the process in the air conditioner connection system according to the third embodiment will be described referring to FIG. 15. FIG. 15 is a flowchart showing a flow of the process in an air conditioner connection system according to the third embodiment. The process performed by the PLC slave unit module adapter 400 shown in FIG. 15 is realized by the CPU 413 executing the authentication process program 412a and the authentication process control program 412c.

As illustrated in FIG. 15, the PLC slave unit module adapter 400 determines whether the PLC authentication processing packet has been received (step S601).

When the PLC authentication processing packet has not been received (No in step S601) as a result of the determination, the PLC slave unit module adapter 400 repeats the same determination step. In contrast, when the PLC authentication processing packet has been received (Yes in step S601) as a result of the determination, the PLC slave unit module adapter 400 determines whether there is set a starting time of the PLC authentication process (step S602).

When there is no setting of the starting time of the PLC authentication process as a result of the determination (No in step S602), the PLC slave unit module adapter 400 is directly shifted to the authentication mode (step S603). In contrast, when there is certain setting of the starting time of the PLC authentication process (Yes in step S602) as a result of the determination, the PLC slave unit module adapter 400 waits for the arrival of the set starting time and then shifts to the authentication mode (step S604).

Next, the PLC slave unit module adapter 400 performs the PLC authentication process with the PLC base unit 20 (step S605). When the PLC authentication process is completed, the PLC slave unit module adapter 400 sends out the authentication result of the PLC authentication process to the air conditioner 300 (step S606).

Next, the PLC slave unit module adapter 400 turns the LEDs of the LED display unit 414 on in a pattern corresponding to the authentication result of the PLC authentication process (step S607), and terminates the process illustrated in FIG. 15.

According to the third embodiment, in the air conditioner connection system 1000, the PLC authentication process can be realized by utilizing the PLC slave unit module adapter 400 having an external configuration of the PLC slave unit module 110. Therefore, when constructing a system that performs the PLC communication in the air conditioner connection system 1000, the system may be constructed by simply connecting the PLC slave unit module adapter 400 to a target home device, and it is possible to keep the manufacturing cost of the home device low as compared to the case of the corresponding function being built in the home device from the beginning. Moreover, because the components required for the PLC communication do not need to be mounted to the home device, it is possible to suppress an increase in size of the home device caused by the addition of the functions required for the PLC communication. Further, it is also possible to reduce the amount of energy consumption by virtue of downsizing of the home device.

In the above-described embodiments, as an example of a home device in which the manual operation is difficult when performing the PLC authentication process, there has been described an air conditioner installed at a high location in the house. However, it is possible to perform the PLC authentication process even in the devices other than the air conditioner installed in the house, by similarly applying the PLC slave unit module 110 or the PLC slave unit module adapter 400 described in the above-mentioned embodiments thereto.

The functions implemented in the PLC slave unit module 110 and the PLC slave unit module adapter 400 described in the aforementioned embodiments are not limited to a case where the CPU reads a program corresponding to each function to execute it, and may be performed by a multifunction circuit such as a system LSI (Large Scale Integration) that integrates the functions. Furthermore, the aforementioned functions may also be performed by linking a plurality of processing circuits corresponding to the respective functions.

The configurations illustrated in the above embodiments are only examples of the contents of the present invention, may also be combined with other publicly-known techniques, and may also be partially omitted and/or modified within the scope that does not depart from the gist of the present invention.

The invention claimed is:

1. An air conditioner connection system comprising: an air conditioner including a first device configured to connect via a power line in a communication-capable manner in which the power line includes a communication signal and to communicate via the power line; and a second device configured to perform radio communication with the air conditioner, wherein
   the air conditioner includes an air-conditioner processor configured to control the first device to perform an authentication process when a starting request of the authentication process for performing power carrier communication is received from the second device,
   the first device includes a power line communication (PLC) processor configured to perform the authentication process under the control of the air conditioner, and
   the second device includes a remote control processor configured to transmit the starting request to the air conditioner and configured to be separate from the PLC processor, and wherein
   the remote control processor is further configured to (i) receive a variable setting, by a user, of a starting time at which the authentication process will start, (ii) count down and display, on a display unit, a remaining time before reaching the starting time in response to the setting of the starting time, and (iii) transmit the starting time and the starting request to the air conditioner in response to the setting of the starting time, and
   the air-conditioner processor is further configured to control the first device to perform the authentication process after the air-conditioner processor waits for the starting time to be reached, when the starting time and the starting request are received from the second device.

2. The air conditioner connection system according to claim 1, wherein the first device is a module provided to the air conditioner.

3. An air conditioner connection system comprising: an air conditioner including a first device configured to connect via a power line in a communication-capable manner in which the power line includes a communication signal and to communicate via the power line; a second device configured to perform radio communication with the air conditioner; and a third device that is connected to an external network via a home network in the communication-capable manner while being connected to the first device via the power line in the communication-capable manner, wherein the air conditioner includes an air-conditioner processor configured to control the first device to perform an authentication process with the third device when a starting request of the authentication process for performing power carrier communication is received from the second device, the first device includes a power line communication (PLC) processor configured to perform the authentication process under the control of the air conditioner, and the second device includes a remote control processor configured to transmit the starting request to the air conditioner and configured to be separate from the PLC processor, and wherein the remote control processor is further configured to (i) receive a variable setting, by a user, of a starting time at which the authentication process will start, (ii) count down and display, on a display unit, a remaining time before reaching the starting time in response to the setting of the starting time, and (iii) transmit the starting time and the starting request to the air conditioner in response to the setting of the starting time, and the air-conditioner processor is further configured to control the first device to perform the authentication process after the air-conditioner processor waits for the starting time to be reached, when the starting time and the starting request are received from the second device.

* * * * *